April 26, 1932.  H. F. VICKERS  1,855,433
VALVE
Filed June 8, 1929  2 Sheets-Sheet 1

Inventor
Harry F. Vickers
by
his Attorney

April 26, 1932.  H. F. VICKERS  1,855,433
VALVE
Filed June 8, 1929  2 Sheets-Sheet 2
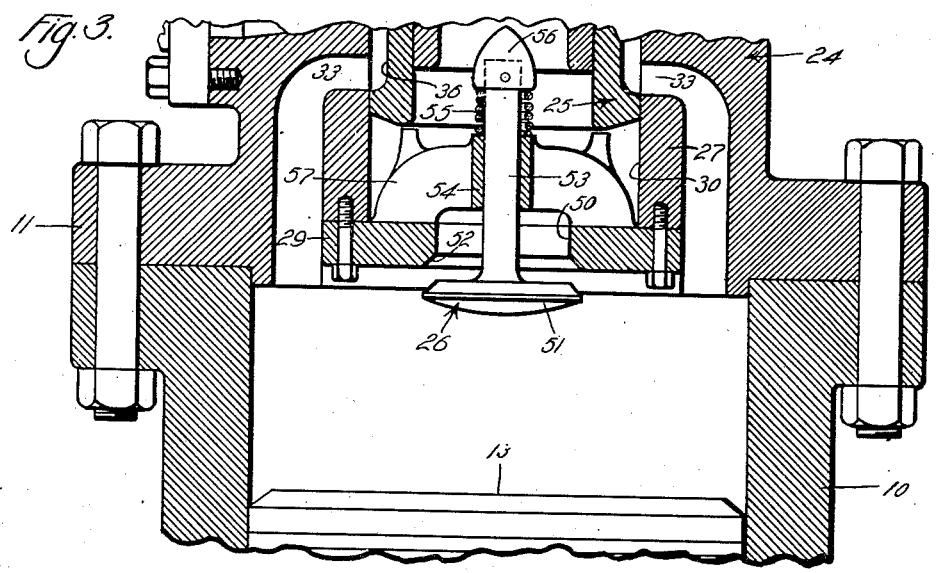
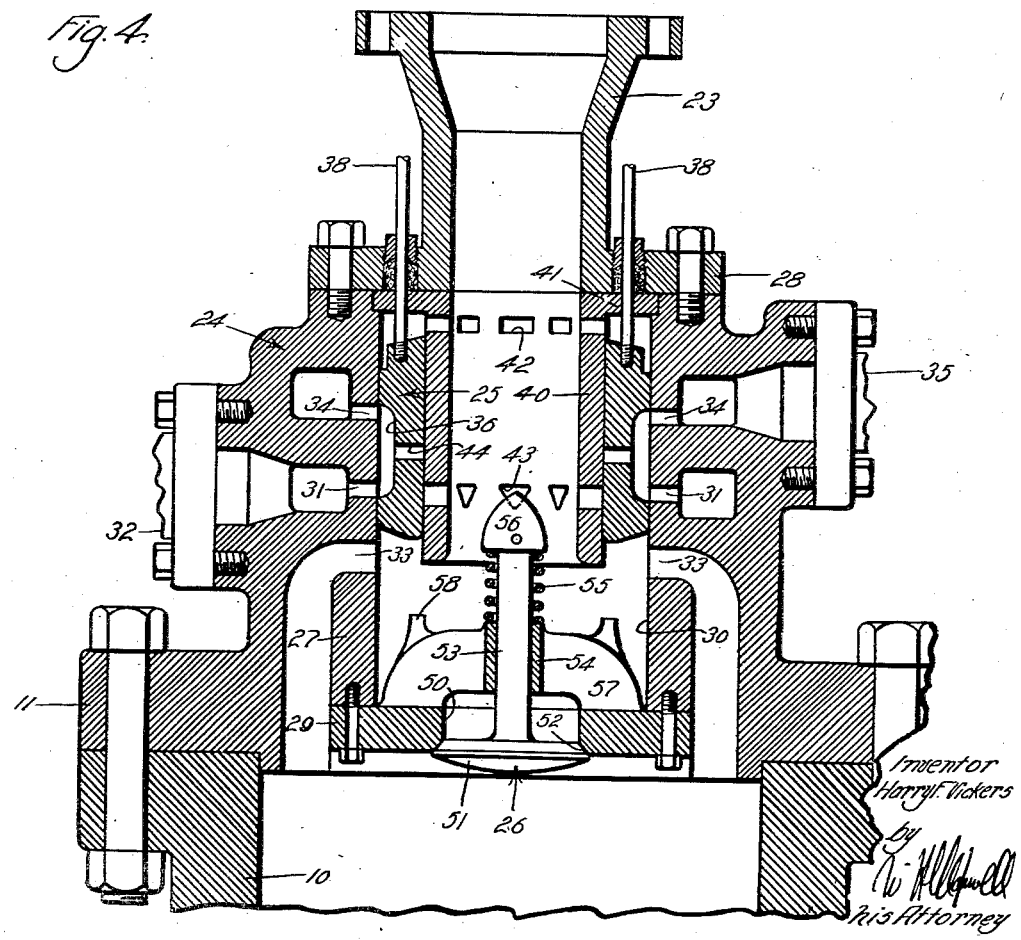

Patented Apr. 26, 1932

1,855,433

UNITED STATES PATENT OFFICE

HARRY F. VICKERS, OF LOS ANGELES, CALIFORNIA

VALVE

Application filed June 8, 1929. Serial No. 369,453.

This invention has to do with a valve and relates particularly to a valve mechanism for controlling a cylinder and piston mechanism, or the like.

It is a general object of the present invention to provide a valve mechanism for controlling a cylinder and piston mechanism including a valve for controlling flow of fluid to and from the cylinder and an auxiliary valve for rapidly admitting fluid to the cylinder under certain conditions of operation of the piston in the cylinder.

A further object of the present invention is to provide a valve of the character mentioned that can be controlled to regulate the forcing of the piston through the cylinder.

It is another object of this invention to provide a simple, effective and practical arrangement and formation of parts in a valve of the character mentioned. The valve provided by the invention is mechanically efficient and practical and is inexpensive of manufacture.

It is a further object of this invention to provide a valve in which the parts are arranged and related to control the flow of fluid to and from the ends of a cylinder without causing severe pressure surge such as usually attends the controlling of fluid to and from a cylinder and piston mechanism.

It is an object of the invention to provide a valve mechanism for connecting a constant delivery pump and a cylinder and piston mechanism, or the like, so that fluid may be delivered to the cylinder and piston mechanism or partially or wholly by-passed so that it does not enter the cylinder and piston mechanism.

Another object of the invention is to provide a valve mechanism of the character mentioned above which may operate to completely close the cylinder and piston mechanism when the fluid is being by-passed through the valve mechanism.

It is another object of the invention to provide a valve mechanism operable to set a cylinder and piston mechanism in any position and by-pass the actuating fluid while the cylinder and piston mechanism is set.

Figure 1:
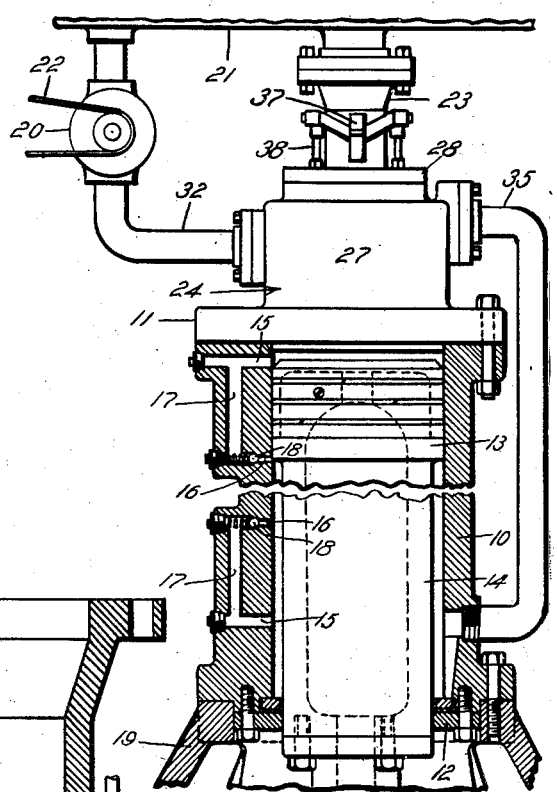
Figure 2:
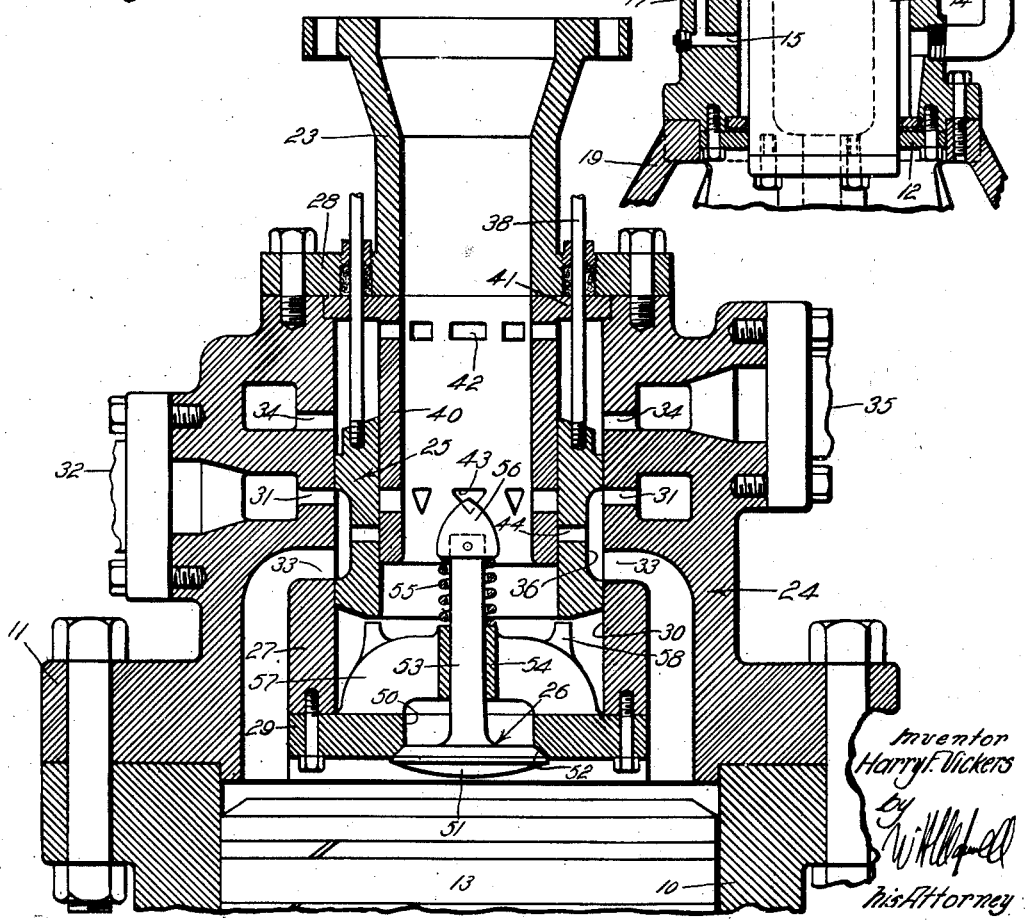

The various objects and features of my invention will be best and more fully understood from the following description of a typical form and application of the invention, throughout which description reference is had to the accompanying drawings, in which:

Fig. 1 is a view showing the valve mechanism provided by this invention applied to a hydraulic apparatus in which the valve mechanism functions to control the flow of fluid between a pump and reservoir and a cylinder and piston mechanism, parts of the cylinder and piston mechanism being shown in section and the piston of the mechanism being shown in an up position in the cylinder. Fig. 2 is an enlarged detailed sectional view of the mechanism provided by this invention showing the mechanism set to admit fluid to the upper end of the cylinder and discharge it from the lower end of the cylinder. Fig. 3 is a view similar to a portion of Fig. 2 showing the auxiliary valve of the mechanism open to admit fluid rapidly to the upper end of the cylinder, and Fig. 4 is a view similar to Fig. 2 showing the valve mechanism in the opposite position, that is, with the parts in position to admit fluid under pressure to the lower end of the cylinder and allow fluid to escape from the upper end of the cylinder.

My present invention is useful, generally, as applied to cylinder and piston mechanisms for the control of fluid to and from the ends of a cylinder. For purpose of example and without limiting the broader principles of the invention, I will describe the invention as applied to the general form or type of hydraulic mechanism set forth and claimed in my co-pending application entitled Hydraulic mechanism, Serial No. 369,454, filed June 8, 1929.

The cylinder and piston mechanism in connection with which I have illustrated my improved valve mechanism includes, generally, a cylinder 10 closed at its upper and lower ends by heads 11 and 12, respectively, a piston 13 slidably carried in the cylinder, and a piston rod 14 attached to the piston and projecting from the lower end of the cylinder through the head 12. A by-pass is provided at each end of the cylinder 10 for by-passing fluid around or past the piston, each by-pass including an outer port 15, an inner port 16, a passage 17 between the ports, and a check valve 18 operable to allow flow from the port 16 to the port 15 but not from the port 15 to the port 16. The cylinder 10 is carried by a mounting 19 so that it is vertically disposed, in which case the piston 13 tends to fall by gravity downwardly through the cylinder.

The general hydraulic mechanism illustrated in Fig. 1 includes, in addition to the cylinder and piston mechanism, a pump 20, a fluid reservoir 21, and the valve mechanism provided by this invention controlling the flow of fluid between the pump and reservoir and the cylinder and piston mechanism. The pump 20 is constantly operated, for instance, it may be continuously driven by a belt 22, or the like, and receives fluid, say, for instance, water or oil from the reservoir 21, and delivers it to the valve mechanism provided by this invention. The valve mechanism is connected with the reservoir 21 by means of an exhaust manifold 23.

The valve mechanism provided by this invention operates to control the distribution of fluid delivered by the pump to the ends of the cylinder and the exhaust or escape of fluid from the ends of the cylinder and also to admit fluid freely and quickly to the upper end of the cylinder upon the piston lowering through the cylinder faster than it is operated by fluid delivered by the pump 20. The valve mechanism includes, generally, a cage 24, a main control valve 25 operable in the cage to control the flow to and from the ends of the cylinder, and an auxiliary valve 26 to admit fluid rapidly to the upper end of the cylinder 10 when the piston tends to move downwardly in the cylinder faster than it is operated by fluid from the pump 20.

The cage 24 incudes, generally, a cylindrical body 27, upper and lower ends 28 and 29 closing the upper and lower ends of the body, respectively, and various openings or ports as will be hereinafter described. The body of the cage is carried by the head 11 of the cylinder and piston mechanism, in fact, it is preferably formed integral with the head 11, and is preferably vertically disposed as shown throughout the drawings. The body 27 has a cylindrical opening 30 extending through it from one end to the other forming a cylinder in which the valve 25 is carried. Supply ports 31 are formed through the wall of the body to open into the bore 30 at a point intermediate the ends of the body. The supply ports 31 are supplied with fluid from the pump 20 through a suitable fluid connection 32. Cylinder ports 33 are formed in the body 27 below the supply ports 31 and connect the bore 30 of the body with the upper end of the cylinder 10. Cylinder ports 34 are formed in the body 27 to communicate with the bore 30 above the supply ports 31 and communicate with a manifold 35 which extends to and connects into the lower end portion of the cylinder 10. With this construction there are ports, namely, the ports 31, 33 and 34 located at spaced points longitudinal of the bore 30 through the body 27 of the cage.

The valve 25 is in the nature of a sleeve valve slidably carried in the bore 30 of the body 27 to cooperate with the ports above described. The sleeve valve 25 has a port 36 which may be in the nature of an annular groove formed in its outer side operable to connect the ports 31 and the ports 33 when the valve is down as shown in Fig. 2 and to connect the ports 31 and the ports 34 when the valve is up as shown in Fig. 4. The length of the sleeve is proportioned to the spacing of the ports in the body 27 so that the upper ports 34 are uncovered by the sleeve when the valve is down to connect the ports 31 and 33 as shown in Fig. 2, while the ports 33 are uncovered when the valve is up to connect the ports 31 and 34 as shown in Fig. 4. The valve 25 is adapted to be operated in the bore 30 between the positions such as I have illustrated in the drawings from a lever 37 at the exterior of the construction through rods 38 which enter the bore 30 of the body through the end 28, as clearly shown in Figs. 2 and 4 of the drawings.

The invention provides a core 40 within the valve 25. The core 40 is preferably tubular in form and is suspended from its upper end to project downwardly into the sleeve valve 25. In the construction illustrated the core 40 is provided at its upper end with a flange 41 by which it is attached to the upper end of the body 27. A plurality of ports 42 is provided through the wall of the core 40 to connect the space above the valve 25 and between the body and core 40 with the interior of the core 40. Further, a plurality of ports 43 is formed through the wall of the core opposite the ports 31 to cooperate with ports 44 formed through the wall of the valve 25 for the purpose of by-passing part or all of the fluid delivered by the pump 20 to the interior of the core rather than directing it all down through the ports 33 to the upper end of the cylinder. The ports 43 are preferably V-shaped or downwardly convergent, so that they offer a means of accurate or delicate control of the fluid by-passed to the interior of the core. It is to be noted that the parts are related and proportioned so that when the valve is in the full down position the ports 43 are out of communication with the ports 44 in which case all of the fluid delivered by the pump 20 is directed into the upper end of the cylinder 10. As the valve is moved upwardly from the full down position shown in Fig. 2, the ports 43 are uncovered by the ports 44 allowing part of the pumped fluid to by-pass, the amount of fluid by-passed being dependent upon the amount the by-pass valve is moved upwardly.

The exhaust manifold 23 which connects the valve mechanism with the reservoir 21 is preferably formed on, in fact, may be formed as an upward extension of the end 28 of the valve cage 24. The manifold 23 is in direct communication with the interior of the core 40 so that fluid discharged into the core 40 can flow through the manifold 23 into the reservoir 21.

The auxiliary valve 26, provided for admitting fluid rapidly into the upper end of the cylinder when the piston 13 tends to move downward in the cylinder faster than it is forced down by fluid delivered from the pump 20, is preferably located in the lower portion of the valve cage 24. In the preferred arrangement the valve 26 is in the nature of a puppet valve controlling flow of fluid through an opening 50 provided in the lower end 29 of the cage 24. The valve 26, as shown in the drawings, includes a head 51 cooperating with a seat 52 formed around the opening 50, a stem 53 projecting upwardly from the head and through a guide 54, and a spring 55 arranged between the guide 54, and a stop 56 in the upper end of the stem. The guide 54 may be formed on or supported from the end 29 through spaced ribs 57 so that the valve 26 is properly guided with reference to the seat 52. The spring 55 is normally under compression between the upper end of the guide 54 and the stop 56 on the upper end of the stem so that it normally yieldingly holds the valve head 51 up in engagement with the seat 52. In the form of the invention illustrated lugs 58 are provided on the ribs 57 to form stops to limit the downward movement of the valve 25.

In operation the pump 20 is normally operated continuously so that it receives fluid, say, oil, from the reservoir 21 and pumps it through the connection 32 to the ports 31. When the valve 25 is down as shown in Fig. 2, the fluid is circulated through the port 36 in the valve to the ports 33 which admit it to the upper end of the cylinder, that is, above the piston 13, causing the piston to be forced downwardly. If the piston 13 is not resisted in its downward movement, it will fall by gravity faster than oil is supplied by the pump 20 to force it downwardly, whereupon the auxiliary valve will open, as shown in Fig. 3, admitting the fluid directly from the interior of the valve cage to the upper end of the cylinder. When the valve 26 is open, any fluid being exhausted into the cage and fluid from the reservoir 21 is free to circulate through the opening 50 and into the upper end of the cylinder. This rapid filling of the upper end of the cylinder as the piston falls continues until the piston is stopped so that it will no longer fall by gravity, whereupon the auxiliary valve 26 closes and the fluid delivered by the pump 20 operates to force the piston on down to the end of its stroke.

When the piston reaches the end of its stroke at the lower end of the cylinder, the by-pass in the cylinder allows the fluid to escape around the piston through the manifold 35, ports 34, ports 42, and into the reservoir 21 through the manifold 23. It is to be understood that as the piston moves downwardly as above described any fluid below the piston discharges through the manifold 35, ports 34, ports 42 and manifold 23. Further, it will be obvious that the rate at which the piston is forced downwardly may be regulated by operating the valve to cause cooperation between the ports 43 and 44, that is, the downward feed of the piston may be regulated by by-passing part of the pump fluid through the parts 43 and 44 rather than directing all of it into the cylinder through the ports 33. When it is desired to return the piston to the upper end of the cylinder, the valve 25 is operated to the position shown in Fig. 4, whereupon the fluid delivered by the pump is circulated through the port 36 and valve 25 to the ports 34 from which it passes through the manifold 35 to the lower end of the cylinder, forcing the piston upwardly in the cylinder. The fluid in the cylinder above the piston escapes from the cylinder through the ports 33 past the lower end of the valve 25 and upwardly through the core 40 and manifold 23.

It is to be noted that the various ports are related so that the valve 25 can be moved to an intermediate position where flow from the pump 20 passes through the ports 31, ports 44, and ports 43, and is completely shut off from the ports 33 and 34 without checking or stopping the flow through the supply pipe thus eliminating chance of surge or shock. In this case the mechanism is in neutral position with the pump simply by-passing or circulating fluid through the valve mechanism without in any way entering or passing through the cylinder and piston mechanism.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A device for use in combination with a cylinder and piston including, a cage, an inlet duct extending to the cage carrying fluid under pressure, an outlet duct communicating with the interior of the cage, a valve operable in the cage to control the flow of fluid from the inlet duct to the cylinder and from the cylinder to the outlet duct, and an auxiliary valve controlling communication between the cylinder and the interior of the cage which is in communication with the outlet duct.

2. A device for use in combination with a cylinder and piston including, a cage, an inlet duct extending to the cage carrying fluid under pressure, an outlet duct communicating with the interior of the cage, a valve operable in the cage to control the flow of fluid from the inlet duct to the cylinder and from the cylinder to the outlet duct, and an auxiliary valve controlling communication between the cylinder and the interior of the cage which is in communication with the outlet duct, the auxiliary valve being operable only to allow flow from the cage to the cylinder.

3. A device for use in combination with a cylinder and piston including, a cage, an inlet duct extending to the cage carrying fluid under pressure, an outlet duct communicating with the interior of the cage, a slide valve operable in the cage to control the flow of fluid from the inlet duct to the cylinder and from the cylinder to the outlet duct, and an auxiliary valve controlling communication between the cylinder and the interior of the cage which is in communication with the outlet duct.

4. A device for use in combination with a cylinder and piston including, a cage, an inlet duct extending to the cage carrying fluid under pressure, an outlet duct communicating with the interior of the cage, a valve operable in the cage to control the flow of fluid from the inlet duct to the cylinder and from the cylinder to the outlet duct, and an auxiliary valve at one end of the cage controlling communication between the cylinder and the interior of the cage which is in communication with the outlet duct.

5. A device for use in combination with a cylinder and piston including, a cage having an inlet port carrying fluid under pressure and cylinder ports communicating with the ends of the cylinder, the interior of the cage being open to discharge fluid, a ported core in the cage, a sleeve valve operable between the cage and core to control the flow of fluid from the inlet port to the cylinder and from the cylinder to the interior of the cage, and an auxiliary valve for admitting fluid from the said interior of the cage to the cylinder.

6. A device for use in combination with a cylinder and piston including, a cage having an inlet port carrying fluid under pressure and cylinder ports communicating with the ends of the cylinder, the interior of the cage being open to discharge fluid, a ported core in the cage, a sleeve valve operable between the cage and core to control the flow of fluid from the inlet port to the cylinder and from the cylinder to the interior of the cage, and an auxiliary valve in one end of the cage for admitting fluid from the said interior of the cage to the cylinder.

7. A device for use in combination with a cylinder and piston including, a cage having an inlet port carrying fluid under pressure and cylinder ports communicating with the ends of the cylinder, the interior of the cage being open to discharge fluid, a ported core in the cage, a sleeve valve operable between the cage and core to control the flow of fluid from the inlet port to the cylinder and from the cylinder to the interior of the cage, and a puppet valve in one end of the cage to allow fluid to discharge from the said interior of the cage to the cylinder.

8. A device for use in combination with a cylinder and piston including, a cage having an inlet port carrying fluid under pressure and cylinder ports communicating with the ends of the cylinder, the cage being open to discharge fluid, a ported core in the cage, a sleeve valve operable between the cage and core to control the flow of fluid from the inlet port to the cylinder and from the cylinder to the interior of the cage, and a puppet valve in one end of the cage to allow fluid free to discharge from the cage to pass to the cylinder, there being a spring in connection with the puppet valve normally holding it closed.

9. A device for use in combination with a cylinder and piston including, a cage having an inlet port carrying fluid under pressure and cylinder ports communicating with the ends of the cylinder, the cage being open to discharge fluid, a ported core in the cage, a ported sleeve valve operable between the cage and core to control the flow of fluid from the inlet port to the cylinder and from the cylinder to the interior of the cage, and an auxiliary valve for allowing fluid free to discharge from the cage to pass to the cylinder.

In witness that I claim the foregoing I have hereunto subscribed my name this 7th day of May, 1929.

HARRY F. VICKERS.